United States Patent
Matsuda

(10) Patent No.: US 8,265,592 B2
(45) Date of Patent: *Sep. 11, 2012

(54) TELEPHONE APPARATUS HAVING CALLING CARD SUPPORT FUNCTION AND IN-VEHICLE HANDSFREE APPARATUS

(75) Inventor: Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 258 days.

This patent is subject to a terminal disclaimer.

(21) Appl. No.: 12/799,974

(22) Filed: May 5, 2010

(65) Prior Publication Data

US 2010/0285773 A1    Nov. 11, 2010

(30) Foreign Application Priority Data

May 11, 2009  (JP) ................................. 2009-114555

(51) Int. Cl.
*H04M 11/00* (2006.01)
(52) U.S. Cl. ..... 455/406; 455/407; 455/408; 455/569.1; 455/569.2; 455/557; 379/114.01; 379/114.15
(58) Field of Classification Search .......... 455/406–408, 455/569.1, 569.2, 557; 379/114.01, 114.15, 379/114.16, 114.17, 114.2
See application file for complete search history.

(56) References Cited

U.S. PATENT DOCUMENTS

| | | | | |
|---|---|---|---|---|
| 5,117,458 A * | 5/1992 | Takaragi et al. | ............ | 380/228 |
| 6,009,156 A | 12/1999 | Cross | | |
| 6,507,644 B1 * | 1/2003 | Henderson et al. | ........ | 379/114.2 |
| 7,254,222 B1 * | 8/2007 | Bauer et al. | ................ | 379/114.2 |
| 2006/0246873 A1 * | 11/2006 | Das et al. | ....................... | 455/411 |
| 2008/0113647 A1 * | 5/2008 | Czajkowski et al. | ......... | 455/407 |

FOREIGN PATENT DOCUMENTS

| | | | | |
|---|---|---|---|---|
| JP | 5-22477 | | | 1/1993 |
| JP | 5-122408 | | | 5/1993 |
| JP | 05122408 A | * | | 5/1993 |

* cited by examiner

*Primary Examiner* — Kamran Afshar
*Assistant Examiner* — Dung Lam
(74) *Attorney, Agent, or Firm* — Harness, Dickey & Pierce, PLC

(57) ABSTRACT

A telephone apparatus is disclosed. The telephone apparatus acquires card information on multiple calling cards from a communication terminal and stores the acquired card information. The telephone apparatus performs, via the communication terminal, telephone communication with a communication counterpart by using a first one of the calling cards stored in the telephone apparatus. When the balance on the first one of the calling cards is changed into zero balance and when the telephone communication link is forcibly disconnected, the telephone apparatus causes the communication terminal to redial by using a second one of the calling cards in order to restart the telephone communication with the same communication counterpart.

7 Claims, 5 Drawing Sheets

FIG. 2

CARD INFO. STORAGE AREA

| CALLING CARD CLASSIFICATION | CARD INFO. | | PRIORITY ORDER |
| --- | --- | --- | --- |
| | ACCESS NUMBER | PIN CODE | |
| CALLING CARD "A" | a1 | a1 | 1 |
| CALLING CARD "B" | b1 | b2 | 2 |
| CALLING CARD "C" | c1 | c2 | 3 |
| ⋮ | ⋮ | ⋮ | ⋮ |
| CALLING CARD "N" | n1 | n2 | n |

TELEPHONE APPARATUS HAVING CALLING CARD SUPPORT FUNCTION AND IN-VEHICLE HANDSFREE APPARATUS

CROSS REFERENCE TO RELATED APPLICATION

The present application is based on Japanese Patent Application No. 2009-114555 filed on May 11, 2009, disclosure of which is incorporated herein by reference.

BACKGROUND OF THE INVENTION

1. Field of the Invention

The present invention relates to a telephone apparatus having a calling card support function, which enables telephone communications using card information on a calling card. The present invention further relates to an in-vehicle handsfree apparatus.

2. Description of Related Art

There is known a telephone apparatus having a calling card support function, which enables telephone communications using card information on a calling card. According to such telephone apparatus, a user can input card information (e.g., access number and PIN code typically appearing on a face of a calling card,) to the telephone apparatus thereby to record the card information in the telephone apparatus. Then, a user can directly input a telephone number of a call destination or reference phone book date to select the phone number of the call destination. In response to the input of the call destination, the telephone apparatus transmits the access number to a center (i.e., a center for providing telephone service using card information on a calling card) as a dialed phone number and transmits a PIN code to the center. Provided that authentification of the PIN code is successful, the telephone apparatus and the call destination are connected to each other via a telephone communication link, and the telephone communications becomes possible. For such telephone apparatus, refer to JP-H5-22477A, JP-H11-239232A corresponding to U.S. Pat. No. 6,009,156, and JP-H5-122408A.

The inventor of the present application has considered that a typical telephone apparatus involves the following difficulty. In typical calling-card-based telephone communications, a communication network side (e.g., a telephone service provider) allows a user to perform the telephone communications using a calling card, provided that the balance on the calling card is larger than zero, in other words, the calling card has a credit balance. When the balance on the calling card reaches zero (the calling card becomes zero balance), the already-established communication link with the communication counterpart is forcibly disconnected by the telephone service provider. When the already-established communication link with the communication counterpart is forcibly disconnected, a user needs to input the card information on another calling card having a credit balance to the telephone apparatus and needs to redial in order to restart the telephone communication with the same communication counterpart. In the above, the operation of inputting of card information of another calling card to a telephone apparatus and then redialing is disadvantageously cumbersome for a user. It should be noted that no measures against this difficulty is suggested and taught in the above-described references: JP-H5-22477A JP-H11-239232A corresponding to U.S. Pat. No. 6,009,156, and JP-H5-122408A.

SUMMARY OF THE INVENTION

In view of the above and other difficulties, it is an objective of the present invention to provide a telephone apparatus having a calling card support function and an in-vehicle handsfree apparatus having a calling card support function.

According to a first aspect of the present invention, a telephone apparatus having a calling card support function is provided. The telephone apparatus includes a card information acquisition section, a card information storage section and a control section. The card information acquisition section is configured to acquire card information on a plurality of calling cards. The card information storage section is configured to simultaneously store therein the card information on the plurality of calling cards on a calling-card-by-calling-card basis, the stored card information being acquired by the card information acquisition section. The control section is configured to control a communication terminal to perform telephone communication with a communication counterpart by using the card information stored in the card information storage section, in a manner including the followings. The control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section. In response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side, the control section causes the communication terminal to make again the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied.

According to the above telephone apparatus, the card information on the multiple calling cards can be stored in the card information storage section of the telephone apparatus in advance. Thus, even if the balance on the first one of the multiple calling cards is changed into zero balance and the telephone communication link with the communication counterpart is forcibly disconnected from the communication network side, the telephone apparatus can promptly restart performing the telephone communication with the same communication counterpart without involving a user in a cumbersome operation of his or her inputting the card information on another calling card to the telephone apparatus, provided that the predetermined condition is satisfied after the forcible disconnection. It is therefore enhance usability.

According to a second aspect of the present invention, an in-vehicle handsfree apparatus is provided. The in-vehicle handsfree apparatus includes a storage medium, a local wireless communication interface device and a controller. The local wireless communication interface device is configured to establish a local wireless communication link with a cellular phone by simultaneously using a data transfer protocol for data transfer and a handsfree communication protocol for handsfree communication. The cellular phone stores therein card information on a plurality of calling card and is external with respect to the in-vehicle handsfree apparatus. The controller is configured to make a determination of whether the handsfree apparatus is powered-on or powered-off. The controller is further configured to control the handsfree communication in a manner including the followings. In response to the determination that the handsfree apparatus is powered-on, the controller causes the local wireless communication interface device to establish the local wireless communication link with the cellular phone, and the controller causes the local wireless communication interface device to acquire the card information on the multiple calling cards from the cellular phone via the local wireless communication link. When the local wireless communication interface device acquires the card information on the multiple calling cards from the cellular phone, the controller records the acquired card information on the multiple calling cards in the storage medium on a calling-card-by-calling-card basis. In response to a telephone communication request, the controller causes the cellular phone to access a telephone communication provider to establish a telephone communication link with a communication counterpart to start the telephone communication with the communication counterpart by using the card information on a first one of the multiple calling cards stored in the storage medium. In response to establishment of the telephone communication link with the communication counterpart, the controller performs the handsfree communication with the communication counterpart via the local wireless communication link, the cellular phone and the telephone communication link by using the card information on the first one of the multiple calling cards. During, the handsfree communications, the controller determines whether a change in balance on the first one of the multiple calling cards into zero balance leads to a forcible disconnection of the already-established telephone communication link with the communication counterpart, the forcible disconnection being made by the telephone communication provider. In response to the forcible disconnection of the already-established telephone communication link with the communication counterpart, the controller selects a second one of the multiple calling cards stored in the storage medium based on a predetermined priority order of the multiple calling cards and causes the cellular phone to access the telephone communication provider to re-establish the telephone communication link with the same communication counterpart to re-start the telephone communication with the same communication counterpart by using the card information on the second one of the multiple calling cards. In response to the determination that the handsfree apparatus is powered-off, the controller deletes the card information on the multiple calling cards from the storage medium.

According to the above in-vehicle handsfree apparatus, the card information on the multiple calling cards can be stored in the storage medium of the in-vehicle handsfree apparatus in advance. Even if the balance on the first one of the multiple calling cards is changed into zero balance and telephone communication link with the communication counterpart is forcibly disconnected by telephone communication provider, the telephone apparatus can promptly restart performing the handsfree communication with the same communication counterpart without involving a user in a cumbersome operation of his or her inputting the card information on another calling card to the in-vehicle handsfree apparatus. It is therefore enhance usability. This advantage becomes more notable when a user performs the handsfree communication while driving a vehicle. This is because the user needs not stop driving to restart the handsfree communication. It should be noted that the user who is driving the vehicle is difficult to input the card information Moreover, since the card information on the multiple calling cards pre-stored in the cellular phone can be transferred to the in-vehicle handsfree apparatus and recorded in the storage medium of the in-vehicle handsfree apparatus, it becomes possible to increase the freedom of card information input ways, and it becomes possible to avoid such a situation where a stranger or a passenger discovers the card information. Furthermore, since the controller deletes the stored card information from the storage medium upon determining that the in-vehicle handsfree apparatus is powered-off, it is possible to prevent abuse of the card information, because the abuse of the card information possibly happens if the card information is left after the power off. It is therefore possible to enhance security.

BRIEF DESCRIPTION OF THE DRAWINGS

The above and other objects, features and advantages of the present invention will become more apparent from the following detailed description made with reference to the accompanying drawings. In the drawings:

FIG. 2 is a diagram illustrating a card information storage area of a storage medium;

DETAILED DESCRIPTION OF THE EXEMPLARY EMBODIMENTS

In one embodiment, a telephone apparatus having a calling card support function is implemented as an in-vehicle handsfree apparatus supporting Bluetooth (registered trademark) and having a Bluetooth communication function. The in-vehicle handsfree apparatus is illustrated below with reference to FIGS. 1 to 5. In the following illustrations, it is assumed that a Bluetooth-supporting cellular phone having a Bluetooth communication function is carried into a compartment of a vehicle equipped with the in-vehicle handsfree apparatus, and the in-vehicle handsfree apparatus and the cellular phone are communicatable with each other via a Bluetooth communication link. For simplicity, Bluetooth is also referred to hereinafter as BT.

Figure 1:
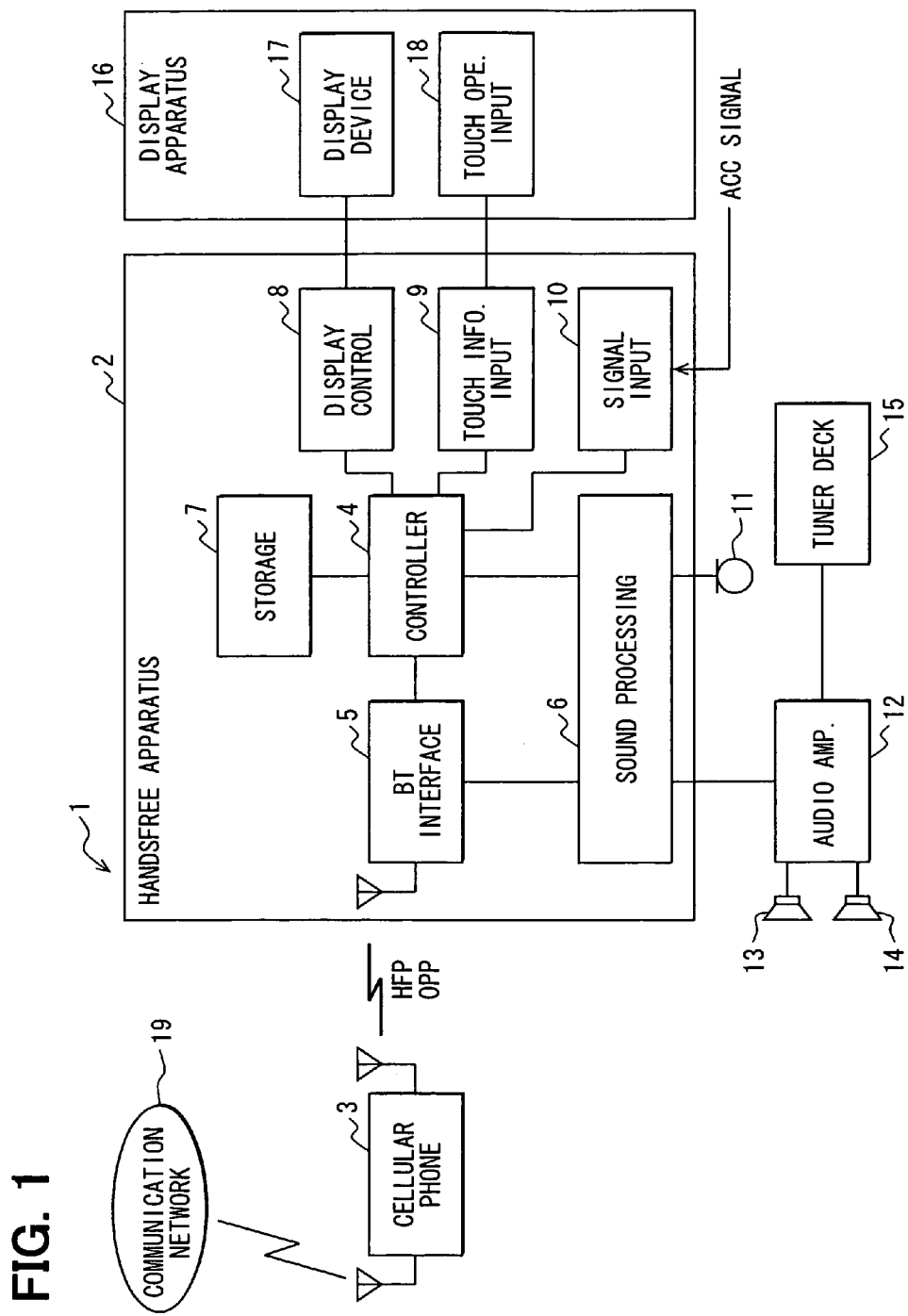
FIG. 1 is a functional block diagram illustrating an in-vehicle handsfree apparatus according to one embodiment.

As shown in FIG. 1, an in-vehicle handsfree system 1 includes an in-vehicle handsfree apparatus 2 and a cellular phone 3. The in-vehicle handsfree apparatus 2 includes a controller 4, a BT interface (IF) device 5, a sound processing device 6, a storage medium 7, a display control device 8, a touch information input device 9, and a signal input device 10.

The controller 4 includes a microcomputer, which has a CPU, a RAM, a ROM, an I/O bus and the like. The controller 4 may control generally all of operations of the in-vehicle handsfree apparatus 2, including a communications operation, an information management operation and the like.

The BT interface device 5 has a function to perform BT communication with the cellular phone 3. When the BT interface device 5 is communicatable with the cellular phone 3 via a BT communication link, the BT interface device 5 can have connection, which is called multi-connection, with the cellular phone 3 by simultaneously using a handsfree profile (HFP) for handsfree communication, an object push profile (OPP) for transfer of various data and the like. The HFP and the OPP are defined in the BT communications standards.

The sound processing device 6 is connected with a microphone 11. The microphone 11 is arranged in a vehicle compartment and is located at a place where efficient collection of user voice is possible. For example, the microphone 11 is located in the vicinity of a steering wheel. The sound processing device 6 is connected with an audio amplifier 12. The audio amplifier 12 is external with respect to the in-vehicle handsfree apparatus 2 and is connected with two speakers 13, 14. The speaker 13 is located at a driver side door and the speaker 14 is located at a front passenger side door for example. The audio amplifier 12 is further connected with a tuner deck 15. When the tuner deck 15 inputs an audio signal to the audio amplifier 12, the audio amplifier 12 amplifies the audio signal and outputs audio content of the audio signal from the speakers 13 and 14. The audio content may be music read from a storage medium for music, a radio program received from a radio station or the like.

The storage medium 7 is configured to have storage areas in which various data are storable. The storage areas of the storage medium 7 include a card information storage area for storing card information on a calling card. More specifically, as shown in FIG. 2, the card information storage area for storing card information on multiple calling cards is reserved in the storage medium 7. The card information storage area can store card information on the multiple calling cards on a calling-card-by-calling-card basis and a priority order of the multiple calling cards. The card information on each calling card includes an access number, a PIN code and the like. In FIG. 2, each of the access numbers "a1", "b1", "c1", , , and "n1" is a phone number having a predetermined number of digits. Each of the PIN codes "a2", "b2", "c2", , , and "n2" is an identification number having a predetermined number of digits. The priority order is assigned so that there is no priority overlap among the multiple calling cards. In other words, the same priority is prohibited from being assigned to two or more calling cards.

In addition to the card information storage area, the storage medium 7 has, for example, a phone book data storage area, an outgoing call history data storage area, an incoming call history data storage area and the like. The phone book data storage area is used for storing phonebook data, which indicates a relationship between phone numbers and corresponding names. The outgoing call history data storage area is used for storing outgoing call history data, which indicates a time and a dialed phone number of an outgoing call made from the in-vehicle handsfree apparatus 2 or the cellular phone 3 connected with the in-vehicle handsfree apparatus 2 using the HFP. The incoming call history data storage area is used for storing incoming call history data, which indicates a time and a caller's phone number of an incoming call received with the cellular phone 3 connected with the in-vehicle handsfree apparatus 2 using the HFP.

The signal input device 10 inputs an accessory signal (ACC signal) from a key switch to the controller 4. While the ACC signal from the key switch is in ON (e.g., high level), the controller 4 causes the in-vehicle handsfree apparatus to, be in a power-on state so that an operation power is supplied from an in-vehicle battery to generally all of the functional blocks of the in-vehicle handsfree apparatus 2, and the in-vehicle handsfree apparatus performs a normal operation in a waking up mode. By contrast, while the ACC signal from the key switch is in OFF (e.g., low level), the controller 4 causes the in-vehicle handsfree apparatus 2 to be in a powers-off state so that the operation power from the in-vehicle battery is supplied to some of the functional blocks of the in-vehicle handsfree apparatus 2, and the in-vehicle handsfree apparatus 2 performs a low power consumption operation in a sleep mode.

The display apparatus 16 includes a display device 17 for displaying a variety of images and/or windows, and a touch operation input device 18 for providing a touch sensitive switch on the images and/or the windows. When receiving a display instruction signal from the controller 4, the display control device 8 controls display operation of the display device 17 of the display apparatus 16 based on the display instruction signal. When the touch information input device 9 receives an operation detection signal from the touch operation input device 18 in response to user operation of the touch switch on the window or the image, the touch information input device 9 outputs the operation detection signal to the controller 4, and the controller 4 analyzes the operation detection signal.

The cellular phone 3 includes a control part, a telephone communication part, a BT interface part, a key part, a memory part, a display part, a microphone, and a speaker. The control part controls generally all of operations of the cellular phone 3. The telephone communication part performs telephone communications via a communication network 19. The BT interface part performs BT communications. In the key part, various keys for user manipulation are arranged. The display part displays various images and/or windows. The microphone receives a user voice. The speaker outputs a voice received from a communication counterpart as an incoming voice. The memory part includes an incoming mail information memory area, an outgoing mail information memory area, a phone book data memory area, and the like. The incoming mail information memory area is used for storing information on an incoming mail received with the cellular phone 3 (e.g., a data and a time of incoming mail reception, a source, a title and a body of an incoming mail). The outgoing mail information memory area is used for storing information on an outgoing mail (e-mail) transmitted from the cellular phone 3 via the communication network (e.g., a data and a time of outgoing mail transmission, a destination, a title and a body). The phone book data memory area is used for storing phonebook data, which indicates a relationship between phone numbers and corresponding names. In addition to the above memory areas, the memory part of the cellular phone 3 has a card information memory area for storing card information on callings card in a manner similar as the storage medium 7 of the in-vehicle handsfree apparatus 2.

The BT interface part of the cellular phone 3 has a function to perform BT communication with the in-vehicle handsfree apparatus 2. The BT interface part of the cellular phone 3 can have the connection by simultaneously using HFP, OPP and the like in a manner similar to that in the BT interface device 5 of the in-vehicle handsfree apparatus 2. In one embodiment, the communication network 19 includes an apparatus for providing cellular phone communication service, such as a cellular phone base station, a base station control apparatus and the like. In addition to the HFP and the OPP, the connection of the in-vehicle handsfree apparatus 2 and the cellular phone 3 may use a phone book access profile (PBAP), a message access profile (MAP) and the like. The PBAP is for transfer of phone book data, incoming call history data and outgoing call history data. The MAP is for e-mail transfer. A term "e-mail" used herein is an inclusive term of text message, image information and the like that are exchangeable via computer network.

According to the above configuration, when a user operates the touch operation input device 18 of the display apparatus 16 to input the card information, which typically appears on a face on a calling card, on calling cards and a priority order of calling cards, the in-vehicle handsfree apparatus 2 records the card information on the calling cards and the priority order of the calling cards in the card information storage area. Moreover, when a user operates the key input part of the cellular phone 3 to input the card information on calling card and a priority of the calling cards, the cellular phone 3 records the card information on the calling cards and the priority order of the calling bards in the card information memory area of the cellular phone 3. In the above, the priority order of calling cards is an order of preferential use of calling cards.

When the cellular phone 3 stores therein the card information on the calling cards and the priority order of the calling cards, a user can operate the key input part of the cellular phone 3 to command the cellular phone 3 to transfer the card information and the priority order. In the above case, provided that the cellular phone 3 and the in-vehicle handsfree apparatus 2 have therebetween connection using the OPP, the cellular phone 3 transfers the card information on the calling cards and the priority order of the calling cards stored therein to the in-vehicle handsfree apparatus 2. Then, when the controller 4 of the in-vehicle handsfree apparatus 2 determines that the card information on the calling cards and the priority order of the calling cards are transferred from the cellular phone 3, the controller 4 records the transferred card information and the transferred priority order in the card information storage area of the storage medium 7.

As seen from the above, there are two ways for recording the card information and the priority order in the in-vehicle handsfree apparatus 2. A first way includes operating the touch operation input device 18 of the display apparatus 16, thereby directly recording the card information and the priority order in the in-vehicle handsfree apparatus 2. A second way includes operating the key input part of the cellular phone 3 to record the card information and the priority order in the cellular phone 3 and then transferring the card information and the priority order to the in-vehicle handsfree apparatus 2, thereby indirectly recording the card information and the priority order in the in-vehicle handsfree apparatus 2. By using the first way or the second way, a user can record the card information on multiple calling cards and the priority order of the multiple calling cards in the in-vehicle handsfree apparatus 2.

When the cellular phone 3 and the in-vehicle handsfree apparatus 2 have therebetween the connection using the HFP, the in-vehicle handsfree system 1 can provide two telephone-communication modes: a handset communication mode (i.e., private communication mode) and a handsfree communication mode.

In the handsfree communication mode, a voice path between the cellular phone 3 and the in-vehicle handsfree apparatus 2 is open to transfer outgoing voice and incoming voice therebetween. More specifically, the incoming voice, which the cellular phone receives via the communication network 21, is transferred to the in-vehicle handsfree apparatus 2 and outputted from the speakers 13, 14. The outgoing voice inputted via the microphone 11 is transferred from the in-vehicle handsfree apparatus 2 to the cellular phone 3, and is transmitted from the cellular phone 3 to the communication network 19.

In the handset communication mode, the voice path between the cellular phone 3 and the in-vehicle handsfree apparatus 2 is closed, and the outgoing voice and the incoming voice are not transferred between the cellular phone 3 and the in-vehicle handsfree apparatus 2. More specifically, the incoming voice, which the cellular phone 3 receives via the communication network 21, is outputted from the speaker of the cellular phone 3. The outgoing voice inputted via the microphone of the cellular phone 3 is transmitted from the cellular phone 3 to the communication network 19. In connection with the handset communication mode and the handsfree communication mode, when a user operates the in-vehicle handsfree apparatus to make an outgoing call or answer an incoming call, the handsfree communication mode is selected. When a user operates the cellular phone to make an outgoing call or answer an incoming call, the handset communication mode is selected.

Figure 3:
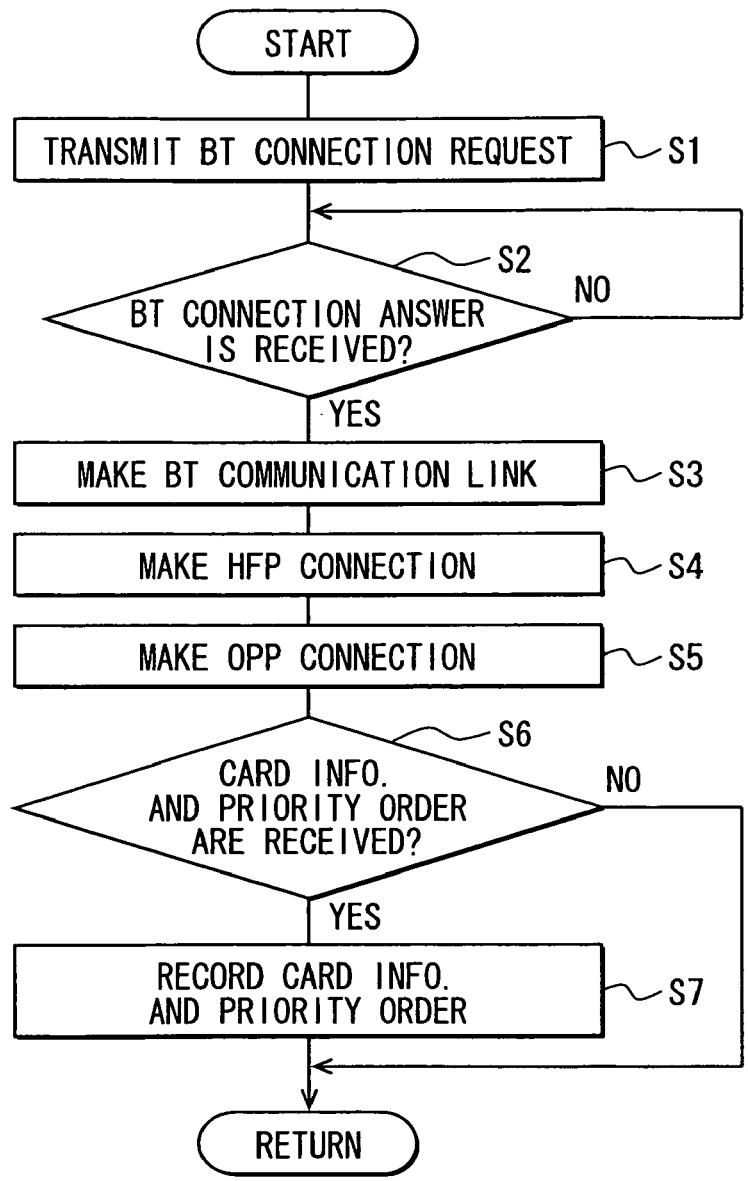
FIG. 3 is a flowchart illustrating a BT communication link connection process.
Figure 4:
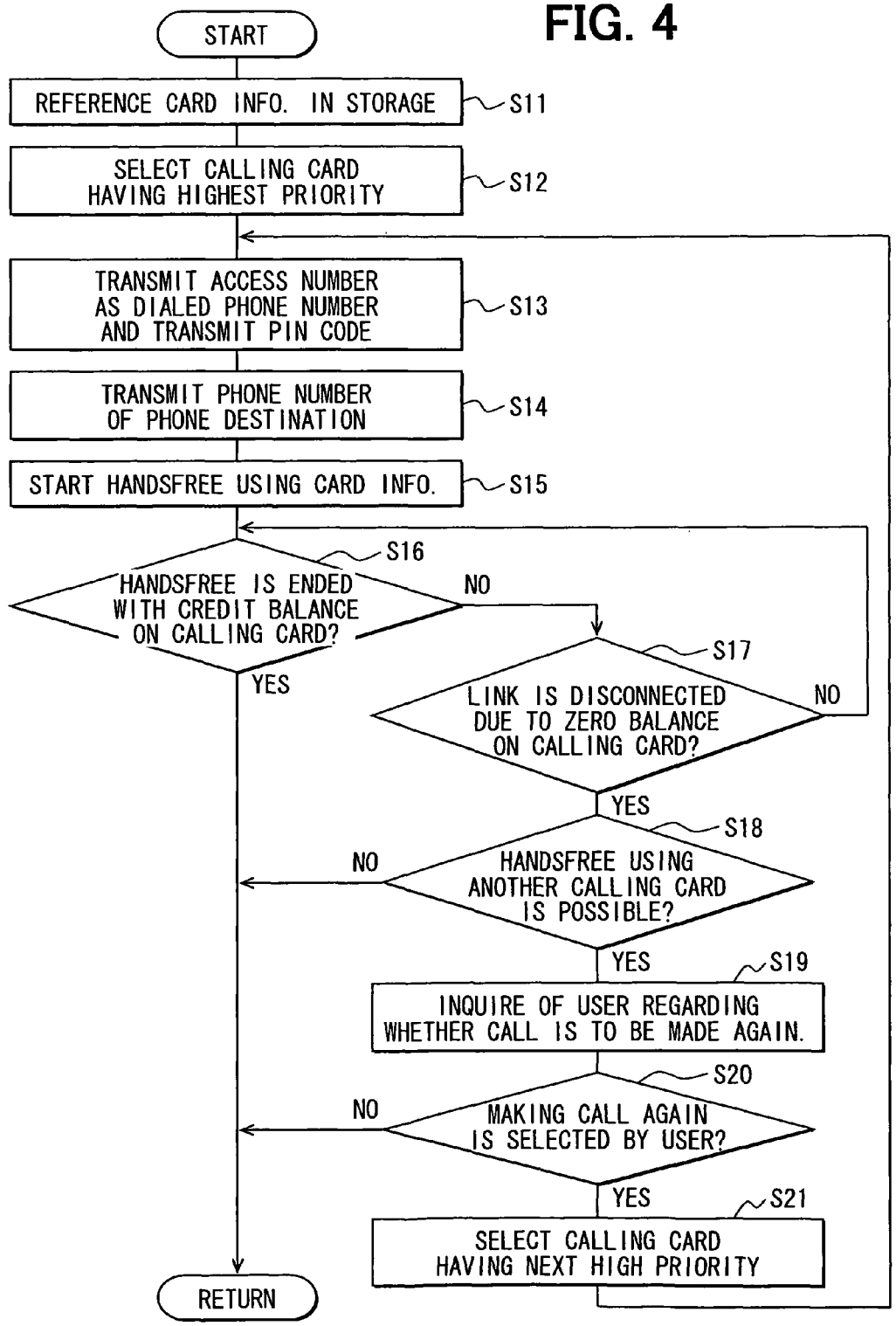
FIG. 4 is a flowchart illustrating a telephone communication process using card information.
Figure 5:
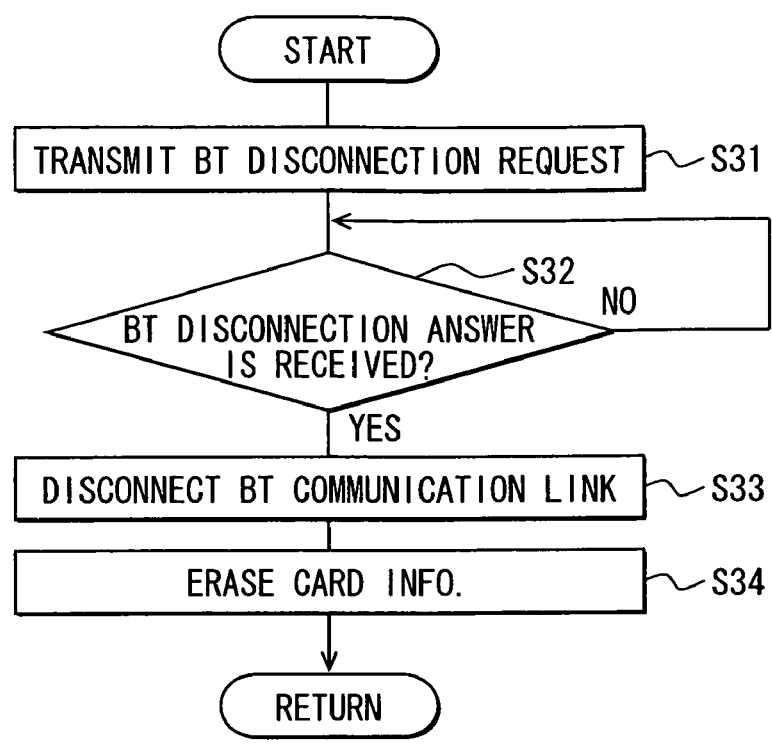
FIG. 5 is a flowchart illustrating a BT communication link disconnection process.

Operation of the in-vehicle handsfree apparatus 2 is illustrated below with reference to FIGS. 3 to 5. FIG. 3 is a flowchart illustrating a BT communication link connection process. FIG. 4 is a flowchart illustrating a telephone communication process using card information on calling cards. FIG. 5 is a flowchart illustrating a BT communication link disconnection process. The processes illustrated in FIGS. 3 to 5 are performed by the in-vehicle handsfree apparatus 2. In the followings, it is assumed that the cellular phone 3 and the in-vehicle handsfree apparatus 2 are communicatable with each other via the BT communication link (i.e., are in a BT communicatable range) and are to perform handsfree communication.

(1) BT Communication Link Connection Process

As described above, when the ACC signal from the key switch is in OFF, the controller 4 causes the in-vehicle handsfree apparatus 2 to be in a power-off state so that the operating power from the in-vehicle battery is supplied to the selected one or ones of the functional blocks and the in-vehicle handsfree apparatus 2 performs the low power consumption operation. In the power off state, the controller 4 performs an ACC signal monitor process of determining whether the ACC signal is turned ON. In response to determination that the ACC signal is turned ON, the controller 4 powers-on the in-vehicle handsfree apparatus 2, causes the operating power from the in-vehicle battery to be supplied to generally all of the functional blocks of the in-vehicle handsfree apparatus 2, causes the in-vehicle handsfree apparatus 2 to perform the normal process, changes process from the ACC signal monitor process to main process, and starts performing the BT communication link connection process (see FIG. 3) as an interrupt process.

In response to start of the BT communication link connection process, the controller 4 performs the followings. At S1, the controller 4 causes the BT interface device 5 to transmit a BT connection request to the cellular phone 3. At S2, the controller 4 waits for the BT interface device 5 to receive a BT connection answer from the cellular phone 3, and the controller 4 determines whether the BT connection answer is received by the BT interface device 5. In the above, the BT connection answer contains identification information which makes it possible to identify the 10, cellular phone 3. The identification information is, for example, a BT address or the like. When the controller 4 determines that the BT connection answer is received by the BT interface device 5, corresponding to "YES" at S2, the process proceeds to S3. At S3, the connection using the BT communication link is established between the BT interface device 5 and the cellular phone. At S4, the connection using the HFP for handsfree communication is established between the BT interface device 5 and the cellular phone 3. At S5, the connection using the OPP for transfer of various data is established between the BT interface device 5 and the cellular phone 3. In the above, the controller 4 analyzes the identification information contained in the BT connection answer, and thereby identifies the cellular phone 3, which is a connection target of the BT communication link.

At S6, the controller 4 waits for the BT interface device 5 to receive, from the cellular phone 3, the card information and the priority order stored in the cellular Phone 3, and the controller 4 determines whether the card information and the priory order are received by the BT interface device 5. In this relation, when a user to command the cellular phone 3 to transfer the card information and the priory order stored in the cellular phone 3 by operating the key input part of the cellular phone 3. In response to the command of transfer of the card information and the priority order, the card information and the priority order stored in the card information memory area of the cellular phone 3 are transmitted from the cellular phone 3 to the in-vehicle handsfree apparatus 2. When the controller 4 determines that the BT interface device 5 receives the card information and the priority order from the cellular phone 3, corresponding to "YES" at S6, the process proceeds to S7. At S7, the controller 4 records the received card information and priority order, which have been transmitted from the cellular phone 3, in the card information storage area of the storage medium 7. Then, the BT communication link connection process is ended and process returns to the main process.

Due to the above BT communication link connection process, a user can transfer the card information on multiple calling cards and the priority order pre-stored in the cellular phone 3 to the in-vehicle handsfree apparatus 2 from the cellular phone 3, and record the transferred card information and the transferred priority order in the in-vehicle handsfree apparatus. To do so, the user may switch the power of the in-vehicle handsfree apparatus 2 from power-off to power-on and then operate the cellular phone 3 to command the cellular phone 3 to transfer the card information and the priority order.

(2) Telephone Communication Process using Card Information

While the ACC signal from the key switch is in ON, the controller 4 performs the main processes and determines whether a call destination is set by a user. When the controller 4 determines that a user sets or inputs a call destination by, for example, directly inputting a phone number of the call destination or referencing to the phone book data to select the call destination, the controller 4 changes process from the main process to the telephone communication process illustrated in FIG. 4 and starts performing the telephone communication process an interrupt process.

When the controller 4 starts performing the telephone communication process using card information, the controller 4 references at S11 the card information that is presently stored in the card information storage area of the storage medium 7. At S12, the controller 4 selects one of the calling cards that presently has the highest priority. In this process, the calling card having the highest priority may be assigned to the lowest numerical value among the multiple calling cards stored in the card information storage area of the storage medium 7. At S13, by using the card information on the calling card selected at S12, the controller 4 accesses a center (e.g., a telephone communication provider for providing telephone communication service using card information on a calling card) in order to establish telephone communication link. Mores specifically, the controller 4 causes the cellular phone 3 to transmit the access number in the card information as a dialed phone number in order to establish telephone communication link to the center. Further, at S13, the controller 4 causes the cellular phone 3 to transmit the PIN code in the card information to the center. At S14, the controller 4 causes the cellular phone 3 to transmits the phone number of the call destination, which is set by a user prior to the start of this telephone communication process, to the center. The center may be referred to herein as a communication network side When the center receives the PIN code from the cellular phone 3, the center establish a telephone communication link between the cellular phone 3 and the communication counterpart assigned to the phone number of the call destination transmitted from the cellular phone 3, provided that authentification of the received PIN code is successful. At S15, in response to establishment of the telephone communication link between the cellular phone 3 and the communication counterpart assigned to the phone number of the call destination, the controller 4 starts performing the handsfree communication with use of the card information on the selected calling card. More specifically, when the card information stored in the card information storage area is like that illustrated in FIG. 2, the controller 4 starts performing the handsfree communication with use of the card information on the calling card "A", to which the priority order "1" is set.

After starting the handsfree communication with use of the card information, the controller 4 determines at S16 whether the handsfree communication is ended without change in balance on the calling card into zero balance. In other words, the controller 4 determines at S16 whether the handsfree communication is ended with the credit balance on the calling card. When the controller 4 determines that the handsfree communication is ended with the zero balance on the calling card, corresponding to "NO" at S16, the process proceeds to S17. At S17, the controller determines whether the established telephone communication link with the communication counterpart is forcibly disconnected from the communication network side (e.g., the center, the telephone service provider etc.) due to the change into the zero balance on the calling card.

When the controller 4 determines at S16 that the handsfree communication is ended with the credit balance on the calling card, corresponding to "YES" at S16, the telephone communication process using card information is ended, and the process returns to the main process. By contrast, when the controller 4 determines at S17 that the established telephone communication link with the communication counterpart is forcibly disconnected by the communication network side due to the change into the zero balance on the calling card, corresponding to "YES" at S17, the process proceeds to S18. At S18, the controller 4 references the card information that is presently stored in the card information storage area of the storage medium 7. Further, the controller 4 determines at S18 whether it is possible to perform the handsfree communication using the card information on another calling card.

When the controller 4 determines that the handsfree communication using the card information on another calling card is impossible because, for example, the card information on another calling card is not stored, corresponding to "NO" at S18, the telephone communication process using card information is ended, and the process returns to the main process. By contrast, when the controller 4 determines that handsfree communication using the card information on another calling card is possible, corresponding to "YES" at S18, the process proceeds to S19. At S19, the controller 4 issues an inquiry to a user about whether a telephone call to the same communication counterpart is to be made again. For example, the controller 4 causes the display device 17 to provide display guidance such as "will you redial by using another calling card?" or the like, thereby issuing the inquiry about whether the call is to be made again. In addition, the controller 4 causes the touch operation input device 18 to provide touch sensitive buttons such as "YES" button, "NO" button and the like on the window to enable a user to select whether the call is to be made again. At S20, the controller determines whether a user chooses to make again the call or not to make again the call. For example, a user is supposed to operate the "YES" button when choosing to make the call again. In contrast, a user is supposed to operate the "NO" button when choosing not to make the call again.

For example, when the controller 4 determines that the "NO" button is operated by a user, and the controller 4 determines that the user chooses not to make the call again, corresponding to "NO" at S20. In this case, the telephone communication process using card information is ended, and the process returns to the main process. In contrast, when the controller 4 determines that the "YES" button is operated by a user, the controller 4 determines that the user chooses to make the call again, corresponding to "YES" at S20. In this case, the process proceeds to S21. At S21, the controller 4 selects one of the calling cards that presently has a next highest priority. For example, the controller 4 may select one of the calling cards that is assigned to a next lowest numerical value. After S21, the process returns to S13, and S13 to S15 are performed again. In the above, the user operation on the "YES" button is an example of a predetermined operation from a user.

More specifically, based on the card information on the selected calling card having the next highest priority, the controller 4 causes the cellular phone 3 to transmit the access number in the card information as a dialed number to establish the telephone communication link with the center, and causes the cellular phone 3 to transmit the PIN code in the card information to the center, and further causes the cellular phone 3 to transmit the phone number of the call destination, which was set by user before, to the center.

In the above case, when the center receives the PIN code from the cellular phone 3, the center re-establishes the telephone communication link between the cellular phone 3 and the communication counterpart assigned to the phone number of the call destination transmitted from the cellular phone 3, provided that authentification of the received PIN code is successful. In response to the re-establishment of the phone communication link between the cellular phone 3 and the communication counterpart assigned to the phone number of the call destination, the controller 4 restarts performing the handsfree communication with use of the card information. For example, when the card information stored in the card information storage area is like that illustrated in FIG. 2, the controller 4 starts performing the handsfree communication by using the calling card "B", the priority order of which is set to "2". From then on, the controller 4 repeatedly perform the above operations each time the controller 4 determines that the established telephone communication link with the communication counterpart is forcibly disconnected from the communication network side due to the change in the balance on the calling card into zero.

According to above manners, even when the established telephone communication link with the communication counterpart is forcibly disconnected from the communication network side due to the change in the balance on the calling card, which was used for the handsfree communication before the forcible disconnection, into zero balance, it is possible to promptly restart telephone communication with the same communication counterpart-without involving a user in a cumbersome operation of inputting card information on another calling card or the like.

(1) BT Communication Link Disconnection Process

As described above, when the ACC signal from the key switch is in ON, the controller 4 performs the main processes while making a determination of whether the ACC signal is turned off. In response to the determination that the ACC signal is turned off, the controller 4 changes the process from the main process to the BT communication link disconnection process so as to start performing the BT communication link disconnection process as an interrupt process.

When the controller 4 starts performing the BT communication link disconnection process, the controller 4 performs the followings. At S31, the controller 4 causes the BT interface device 5 to transmit a BT disconnection request to the cellular phone 3. At S32, the controller 4 waits for the BT interface device 5 to receive a BT disconnection answer from the cellular phone 3, and determines whether the BT interface device 5 receives the BT disconnection answer from the cellular phone 3. When the controller 4 determines that the BT interface device 5 receives the BT disconnection answer from the cellular phone 3, corresponding to "YES" at S32, the process proceeds to S33. At S33, the controller 4 disconnects the BT communication link between the BT interface device 5 and the cellular phone 3. At S34, the controller 4 erases and deletes the card information that is stored in the card information storage area of the storage medium. Then, the BT communication link disconnection process is ended, and the process returns to the main process.

In the above-described example, after the telephone communication link with the communication counterpart is forcibly disconnected from the communication network side due to the change in the balance on the calling card, which was used for the handsfree communication before the forcible disconnection, into zero balance, the inquiry such as "will you redial by using another calling card?" or the like is issued to a user in order to determine whether the telephone call is to be again made by using card information on another calling card, and then, the cellular phone 3 is caused to make the telephone call again, provided that the user chooses to make the telephone call again. Alternatively, the cellular phone 3 may be caused to make again the telephone call unconditionally (e.g., without making the inquiry to a user).

Moreover, in the above example, when the card information on multiple calling cards is stored in the card information storage area on a calling-card-by-calling-card basis, the calling card to be used in a next time is selected according to the priority order, which was recorded in advance by a user. Alternatively, by referencing the balances on the multiple calling cards, the controller may preferentially or automatically select one of the calling cards that has a smallest balance, or one of the calling cards that has a largest balance.

According to the present embodiment, the in-vehicle handsfree apparatus 2 is configured to control the cellular phone 3 and perform, via the cellular phone 3, the telephone communication with a communication counterpart via a telephone communication link by using the card information on a first one of multiple calling cards stored in the card information storage area. Further, in response to forcible disconnection of the telephone communication link from a communication network side due to a change in balance on the first one of the multiple calling cards into zero balance, the in-vehicle handsfree apparatus 2 makes again the call to the communication network side (e.g., the center, the telephone communication provider, or the like) in order to perform the telephone communication with the same communication counterpart by using a second one of the multiple calling cards stored in the card information storage area. According to this configuration, upon the forcible disconnection of the telephone communication link with the communication counterpart, it is possible to promptly restart the telephone communication with the same communication counterpart without involving a user in a cumbersome operation of inputting card information on another calling card and the like. It is therefore possible to enhance usability and operability. Moreover, considering that the in-vehicle handsfree apparatus 2 is mounted to a vehicle; the above-described merit becomes more notable. This is because the user needs not stop the vehicle in order to input the card information. It should be noted that a user who is driving the vehicle cannot input card information on another calling card.

Moreover, according to the present embodiment, the in-vehicle handsfree apparatus 2 can be configured to issue an inquiry to a user about whether the call is to be again made to restart the handsfree communication using card information on another calling card. When the user chooses to make the call again, the in-vehicle handsfree apparatus 2 causes the cellular phone 3 to make again the call in order to perform the telephone communication with the same communication counterpart via the communication network by using the card information on another one of the multiple calling cards stored in the card information storage area. This configuration makes it possible to select, after the forcible disconnection of the telephone communication link with a communication counterpart, whether the telephone communication with the same communication counterpart is to be restarted.

Moreover, according to the present embodiment, the in-vehicle handsfree apparatus can be configured such that: in response to the switching of the in-vehicle handsfree apparatus from the power-off to the power-on, the BT communication link is established between the in-vehicle handsfree apparatus 2 and the cellular phone 3; and the card information stored in the cellular phone 3 is transferred from the cellular phone 3 to the in-vehicle handsfree apparatus 2 when a user operates the cellular phone 3. According to this configuration, a user can record the card information on the multiple calling cards in the cellular phone 3 in advance, and then the user can power-on the in-vehicle handsfree apparatus 2 and operate the cellular phone 3 in order to transfer the card information on multiple calling cards pre-stored in the cellular phone 3 to the in-vehicle handsfree apparatus 2 and in order to record the transferred card information on the multiple calling cards in the in-vehicle handsfree apparatus 2. As a result, it becomes unnecessary for a user to operate the touch operation input device 20 of the in-vehicle handsfree apparatus 2 to input the card information to the in-vehicle handsfree apparatus 2. Thus, since the cellular phone 3 (which is user-portable) can be used to input the card information in the in-vehicle handsfree apparatus 2, it is possible to increases the freedom of environment for inputting card information in the in-vehicle handsfree apparatus 2, and it is possible to avoid such a situation where a stranger or a passenger see the card information. It is therefore possible to enhance security.

Moreover, according to the above embodiment, the card information stored in the card information storage area of the storage medium 7 is erased and deleted in response to the switching of the in-vehicle handsfree apparatus 2 from the power-on to the power-off. It is therefore possible to avoid the abuse of the card information. It should be noted that the abuse of the card information would happen if the card information were left after the power off. The present embodiment can therefore enhance security.

The above embodiment can be modified and extended in various ways, examples of which are described below.

In the above embodiment, a telephone apparatus having a calling card support function is implemented as an in-vehicle handsfree apparatus. However, a telephone apparatus having a calling card support function is not limited to an in-vehicle handsfree apparatus. For example, as long as a telephone apparatus having a calling card support function has a function to perform telephone communications using card information on a calling card, the telephone apparatus may be provided as, for example, another in-vehicle apparatus such as an in-vehicle navigation apparatus and the like. Alternatively, the telephone apparatus may be a portable device, which is portable by a user.

In the above embodiment, the display guidance is provided in order to visually issue an inquiry to a user about whether a call is to be again made to perform handsfree communication using card information on another calling card. Alternatively, an audio guidance may be outputted to auditorily issue the inquiry to a user. Alternatively, both of the display guidance and the audio guidance may be provided in order to issue the inquiry to a user.

A profile used in transferring card information from a cellular phone to an in-vehicle handsfree apparatus is not limited to the OPP, and may be another profile.

In the above embodiment, in response to user operation on the cellular phone after establishment of the BT communication link, the card information is transferred from the cellular phone to the in-vehicle handsfree apparatus. Alternatively, an in-vehicle handsfree apparatus may be configured such that, after establishment of a BT communication link, card information is automatically transferred from a cellular phone to the in-vehicle handsfree apparatus.

In the above embodiments, the controller erases the card information from the card information storage area upon determining that the in-vehicle handsfree apparatus is switched from power-on to power-off. Alternatively, the controller may erase the card information not based on the switching of the in-vehicle handsfree apparatus from power-on and power-off but based on HFP disconnection.

In the above embodiments and modifications, the n-vehicle handsfree apparatus 2 can act as a telephone apparatus having a calling card support function. The cellular phone 3 can act as a communication terminal, and a telephone communication means or the like. The controller 4 can act as a card information acquisition section or means, a control section or means, an operation acceptance section or means, a power-on determination section or means, and a power-off determination section or means. The BT interface device 5 can act as a local wireless communication interface device or means, a data transfer protocol connection section or means, and a handsfree communication protocol connection section or means. The storage medium 7 can act as card information storage section or means. The BT communication link can act as a local wireless communication link. The HFP can act as handsfree communication protocol. The OPP can act as a data transfer protocol.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be installed in a computer via a communications network.

What is claimed is:

1. A telephone apparatus having a calling card support function, the telephone apparatus comprising:
a card information acquisition section configured to acquire card information on a plurality of calling cards;
a card information storage section configured to simultaneously store therein the card information on the plurality of calling cards on a calling-card-by-calling-card basis, the stored card information being acquired by the card information acquisition section; and
a control section configured to control a communication terminal to perform telephone communication with a communication counterpart by using the card information stored in the card information storage section, in such manner that:
the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and
in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side,
the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied; wherein
the communication terminal is a cellular phone, the telephone apparatus further comprising:
a power-on determination section configured to make a determination of whether the telephone apparatus is switched from power-off to power-on; and
a data transfer protocol connection section configured to establish connection with the cellular phone by using a data transfer protocol for data transfer when the telephone apparatus and the cellular phone are communicatable with each other via a local wireless communication link,
wherein
the card information acquisition section is allowed to acquire, from the cellular phone, the card information on the plurality of calling cards stored in the cellular phone, in response to (i) the determination that the telephone is switched from the power-off to the power-on and (ii) establishment of the connection with the cellular phone by using the data transfer protocol, the connection allowing the cellular phone to transfer the card information on each calling card stored in the cellular phone.

2. A telephone apparatus having a calling card support function, the telephone apparatus comprising:
a card information acquisition section configured to acquire card information on a plurality of calling cards;
a card information storage section configured to simultaneously store therein the card information on the plurality of calling cards on a calling-card-by-calling-card basis, the stored card information being acquired by the card information acquisition section; and
a control section configured to control a communication terminal to perform telephone communication with a communication counterpart by using the card information stored in the card information storage section, in such manner that:
the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and
in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side,
the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied;
a power-off determination section configured to make a determination of whether the telephone apparatus is switched from the power-on to the power-off,
wherein
in response to the determination that the telephone apparatus is switched from the power-on to the power-off, the control section erases the card information stored in the card information storage section.

3. A telephone apparatus having a calling card support function, the telephone apparatus comprising:
a card information acquisition section configured to acquire card information on a plurality of calling cards;
a card information storage section configured to simultaneously store therein the card information on the plurality of calling cards on a calling-card-by-calling-card basis, the stored card information being acquired by the card information acquisition section;
a control section configured to control a communication terminal to perform telephone communication with a communication counterpart by using the card information stored in the card information storage section, in such manner that:
the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side, the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied; and the plurality of calling cards is three or more calling cards;

the card information storage section stores therein the card information on the three or more calling cards on the calling-card-by-calling-card basis while respectively assigning priorities to the three or more calling cards; and in response to the change in balance on a first one of the three or more calling cards into zero balance and the resultant forcible disconnection of the telephone communication link, which was established for the telephone communication with the communication counterpart by using the card information on the first one of the three or more calling cards, from the communication network side, the control section (i) selects a second one of the three or more calling cards that has a highest priority from among the three or more callings cards except the first one, (ii) causes the communication terminal to again make the phone call to the communication network side in order to perform, via the communication terminal, the telephone communication with the same communication counterpart by using the card information on the second one of the plurality of calling cards.

4. A telephone apparatus having a calling card support function, the telephone apparatus comprising:

a card information acquisition section configured to acquire card information on a plurality of calling cards;

a card information storage section configured to simultaneously store therein the card information on the plurality of calling cards on a calling-card-by-calling-card basis, the stored card information being acquired by the card information acquisition section; and a control section configured to control a communication terminal to perform telephone communication with a communication counterpart by using the card information stored in the card information storage section, in such manner that:

the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side, the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied; wherein the plurality of calling cards is three or more calling cards;

the card information storage section stores therein the card information on the three or more calling cards on the calling-card-by-calling-card basis; and in response to the change in balance on a first one of the three or more calling cards into zero balance and the resultant forcible disconnection of the telephone communication link, which was established for the telephone communication with the communication counterpart by using the card information on the first one of the three or more calling cards, from the communication network side, the control section (i) selects a second one of the three or more calling cards that has a smallest balance from among the three or more callings cards except the first one, and (ii) causes the communication terminal to again make the phone call via the communication network side in order to perform, via the communication terminal, the telephone communication with the same communication counterpart by using the card information on the second one of the plurality of calling cards.

5. A telephone apparatus having a calling card support function, the telephone apparatus comprising:

a card information acquisition section configured to acquire card information on a plurality of calling cards;

a card information storage section configured to simultaneously store therein the card information on the plurality of calling cards on a calling-card-by-calling-card basis, the stored card information being acquired by the card information acquisition section; and a control section configured to control a communication terminal to perform telephone communication with a communication counterpart by using the card information stored in the card information storage section, in such manner that:

the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side, the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied; wherein the plurality of calling cards is three or more calling cards;

the card information storage section stores therein the card information on the three or more calling cards on the calling-card-by-calling-card basis; and in response to the change in balance on a first one of the three or more calling cards into zero balance and the resultant forcible disconnection of the telephone communication link, which was established for the telephone communication with the communication counterpart by using the card information on the first one of the three or more calling cards, from the communication network side, the control section (i) selects a second one of the three or more calling cards that has a largest balance from among the three or more callings cards except the first one, and (ii) causes the communication terminal to again make the phone call via the communication network side in order to perform, via the communication terminal, the telephone communication with the same communication counterpart by using the card information on the second one of the plurality of calling cards.

6. A telephone apparatus having a calling card support function, the telephone apparatus comprising:

a card information acquisition section configured to acquire card information on a plurality of calling cards;

a card information storage section configured to simultaneously store therein the card information on the plurality of calling cards on a calling-card-by-calling-card basis, the stored card information being acquired by the card information acquisition section; and a control section configured to control a communication terminal to perform telephone communication with a communication counterpart by using the card information stored in the card information storage section, in such manner that:

the control section causes the communication terminal to make a phone call to a communication network side and performs, via the communication terminal, the telephone communication with the communication counterpart via a telephone communication link with the communication counterpart by using the card information on a first one of the plurality of calling cards stored in the card information storage section; and in response to a change in balance on the first one of the plurality of calling cards into zero balance and resultant forcible disconnection of the telephone communication link, which was established for the telephone communication with the communication counterpart by using the card information on the first one of the plurality of calling cards, from the communication network side, the control section causes the communication terminal to again make the phone call to the communication network side in order to perform, via the communication terminal, the telephone communication with the same communication counterpart by using the card information on a second one of the plurality of calling cards stored in the card information storage section, provided that the control section determines that a predetermined conduction is satisfied; wherein the communication terminal is a cellular phone, the telephone apparatus further comprising:

a handsfree protocol connection section configured to establish connection with the cellular phone by using a handsfree communication protocol for handsfree communication when the telephone apparatus and the cellular phone are communicatable with each other via a local wireless communication link, wherein the control section performs the handsfree communication as the telephone communication by using the card information, through (i) causing the handsfree protocol connection section to establish the connection with the cellular phone by using the handsfree communication protocol and (ii) opening a voice path between the telephone apparatus and the cellular phone to transmit therebetween an outgoing voice and receive an incoming voice.

7. An in-vehicle handsfree apparatus comprising:

a storage medium;

a local wireless communication interface device that is configured to establish a local wireless communication link with a cellular phone by simultaneously using a data transfer protocol for data transfer and a handsfree communication protocol for handsfree communication, the cellular phone storing therein card information on a plurality of calling card and being external with respect to the in-vehicle handsfree apparatus; and a controller that is configured to make a determination of whether the handsfree apparatus is powered-on or powered-off, and that is further configured to control the handsfree communication, such that:

in response to the determination that the handsfree apparatus is powered-on, the controller causes the local wireless communication interface device to establish the local wireless communication link with the cellular phone, and the controller causes the local wireless communication interface device to acquire the card information on the plurality of calling cards from the cellular phone via the local wireless communication link;

when the local wireless communication interface device acquires the card information on the plurality of calling cards from the cellular phone, the controller records the acquired card information on the plurality of calling cards in the storage medium on a calling-card-by-calling-card basis;

in response to input of a phone number of a communication counterpart, the controller causes the cellular phone to access a telephone communication provider to establish a telephone communication link with the communication counterpart to start the telephone communication with the communication counterpart by using the card information on a first one of the plurality of calling cards stored in the storage medium;

in response to establishment of the telephone communication link with the communication counterpart, the controller performs the handsfree communication with the communication counterpart via the local wireless communication link, the cellular phone and the telephone communication link by using the card information on the first one of the plurality of calling cards;

during the handsfree communications, the controller determines whether a change in balance on the first one of the plurality of calling cards into zero balance leads to a forcible disconnection of the already-established telephone communication link with the communication counterpart, the forcible disconnection being made by the telephone communication provider;

in response to the forcible disconnection of the already-established telephone communication link with the communication, the controller selects a second one of the plurality of calling cards stored in the storage medium based on a predetermined priority order of the plurality of calling cards and causes the cellular phone to access the telephone communication provider to re-establish the telephone communication link with the same communication counterpart to re-start the telephone communication with the same communication counterpart by using the card information on the second one of the plurality of calling cards; and in response to the determination that the handsfree apparatus is powered-off, the controller deletes the card information on the plurality of calling cards from the storage medium.

* * * * *